United States Patent [19]
Keene et al.

[11] Patent Number: 5,510,843
[45] Date of Patent: Apr. 23, 1996

[54] FLICKER REDUCTION AND SIZE ADJUSTMENT FOR VIDEO CONTROLLER WITH INTERLACED VIDEO OUTPUT

[75] Inventors: David Keene, San Mateo; Jimmy Yang, Santa Clara; Kevin Chang, San Jose, all of Calif.

[73] Assignee: Cirrus Logic, Inc., Fremont, Calif.

[21] Appl. No.: 316,167

[22] Filed: Sep. 30, 1994

[51] Int. Cl.$^6$ ................................................. H04N 7/01
[52] U.S. Cl. ........................... 348/446; 348/441; 348/447
[58] Field of Search ........................... 348/446, 447, 348/445, 443, 444, 458, 453, 441, 910, 606, 607, 615; 345/154, 138; 358/525, 445; 395/154, 153; H04N 5/21, 5/46, 7/01

[56] References Cited

U.S. PATENT DOCUMENTS

| | | | |
|---|---|---|---|
| 3,832,487 | 8/1974 | de Niet | 178/7.2 |
| 3,953,668 | 4/1976 | Judice | 178/6 |
| 4,012,772 | 3/1977 | Chambers et al. | 358/11 |
| 4,298,888 | 11/1981 | Colles et al. | 358/140 |
| 4,377,821 | 3/1983 | Sautter et al. | 358/133 |
| 4,386,367 | 5/1983 | Peterson et al. | 358/140 |
| 4,400,719 | 8/1983 | Powers | 358/21 R |
| 4,412,251 | 10/1983 | Tanaka et al. | 358/160 |
| 4,455,572 | 6/1984 | Malden | 358/160 |
| 4,506,298 | 3/1985 | Mansell et al. | 358/160 |
| 4,607,282 | 8/1986 | Van de Polder | 348/447 |
| 4,649,378 | 3/1987 | Johnson et al. | 340/728 |
| 4,761,686 | 8/1988 | Willis | 358/160 |
| 4,799,105 | 1/1989 | Mitchell et al. | 358/160 |
| 4,894,653 | 1/1990 | Frankenback | 345/154 |
| 4,924,315 | 5/1990 | Yamashita | 358/160 |
| 4,941,045 | 7/1990 | Birch | 358/140 |
| 4,941,127 | 6/1990 | Hashimoto | 365/189.01 |
| 4,996,595 | 2/1991 | Naito et al. | 358/150 |
| 5,005,011 | 4/1991 | Pearlman et al. | 340/728 |
| 5,019,904 | 5/1991 | Campbell | 358/140 |
| 5,034,814 | 7/1991 | Watson | 358/141 |
| 5,099,327 | 3/1992 | Murakoshi | 358/140 |
| 5,136,385 | 8/1992 | Campbell | 358/160 |
| 5,146,329 | 9/1992 | Flamm | 358/166 |
| 5,168,359 | 12/1992 | Mills | 358/140 |
| 5,170,251 | 12/1992 | Levy | 348/446 |
| 5,182,643 | 1/1993 | Futscher | 358/140 |
| 5,229,853 | 7/1993 | Myers | 358/140 |
| 5,337,089 | 8/1994 | Fisch | 348/446 |
| 5,339,160 | 8/1994 | Shindou | 348/571 |

FOREIGN PATENT DOCUMENTS

| | | | |
|---|---|---|---|
| 3-144492 | 5/1991 | Japan | G09G 5/00 |
| 6-46299 | 5/1994 | Japan | H04N 5/217 |
| WO 94/11854 | 5/1994 | WIPO | G09G 1/16 |

*Primary Examiner*—Safet Metjahic
*Attorney, Agent, or Firm*—Robert Platt Bell & Associates

[57] ABSTRACT

An apparatus and method are provided for reducing flicker and/or vertically scaling an interlaced video image. In a first embodiment, a sequence controller selectively addresses a video memory to retrieve pixel data from adjacent scan lines. The pixel data is multiplexed and converted into RGB data in a look up table and stored in upper and lower latches as upper and lower pixel data. The upper and lower pixel data is then weighted using a predetermined weighting scheme to produce hybrid pixel color data for an even or odd field. By reducing relative contrast between even and odd field lines, flicker is reduced. In a second embodiment, vertical resolution is reduced, for example, from 480 lines to 400 lines, by applying a series of weighting schemes or filters to weight data from six input lines into five output lines. To reduce flicker in the output lines, data from adjacent lines may weighted to reduce relative contrast. Due to the 6:5 reduction, a discontinuity in the output lines may exist where adjacent line data is not weighted. Luminance data from a third adjacent line may be weighted with pixel data from adjacent lines to reduce flicker at the discontinuity.

41 Claims, 9 Drawing Sheets

| EVEN FIELD INPUT LINES | Y OUTPUT | FILTER # | ODD FIELD INPUT LINES | Y OUTPUT | FILTER # | OUTPUT LINE | LINE COUNT |
|---|---|---|---|---|---|---|---|
| 0, 1 | — | 1 | 1, 2 | — | 2 | 0 | 0 |
| 2, 3, Y4 | SAVE Y3 | 3 | Y3, 4, 5 | SAVE Y4 | 4 | 1 | 1 |
| 5, 6 | — | 5 | 6, 7 | — | 1 | 2 | 2 |
| 7, 8 | — | 2 | 8, 9, Y10 | SAVE Y9 | 3 | 3 | 3 |
| Y9, 10, 11 | SAVE Y10 | 4 | 11, 12 | — | 5 | 4 | 4 |
| 12, 13 | — | 1 | 13, 14 | — | 2 | 5 | 0 |
| 14, 15, Y16 | SAVE Y15 | 3 | Y15, 16, 17 | SAVE Y16 | 4 | 6 | 1 |
| 17, 18 | — | 5 | 18, 19 | — | 1 | 7 | 2 |
| 19, 20 | — | 2 | 20, 21, Y22 | SAVE Y21 | 3 | 8 | 3 |
| Y21, 22, 23 | SAVE Y22 | 4 | 23, 24 | — | 5 | 9 | 4 |
| ... | ... | ... | ... | ... | ... | ... | ... |
| 475, 476 | — | 2 | 476, 477, Y478 | SAVE Y477 | 3 | 198 | 3 |
| Y477, 478, 479 | SAVE Y478 | 4 | 479, 479 | — | 5 | 199 | 4 |

*Figure 6*

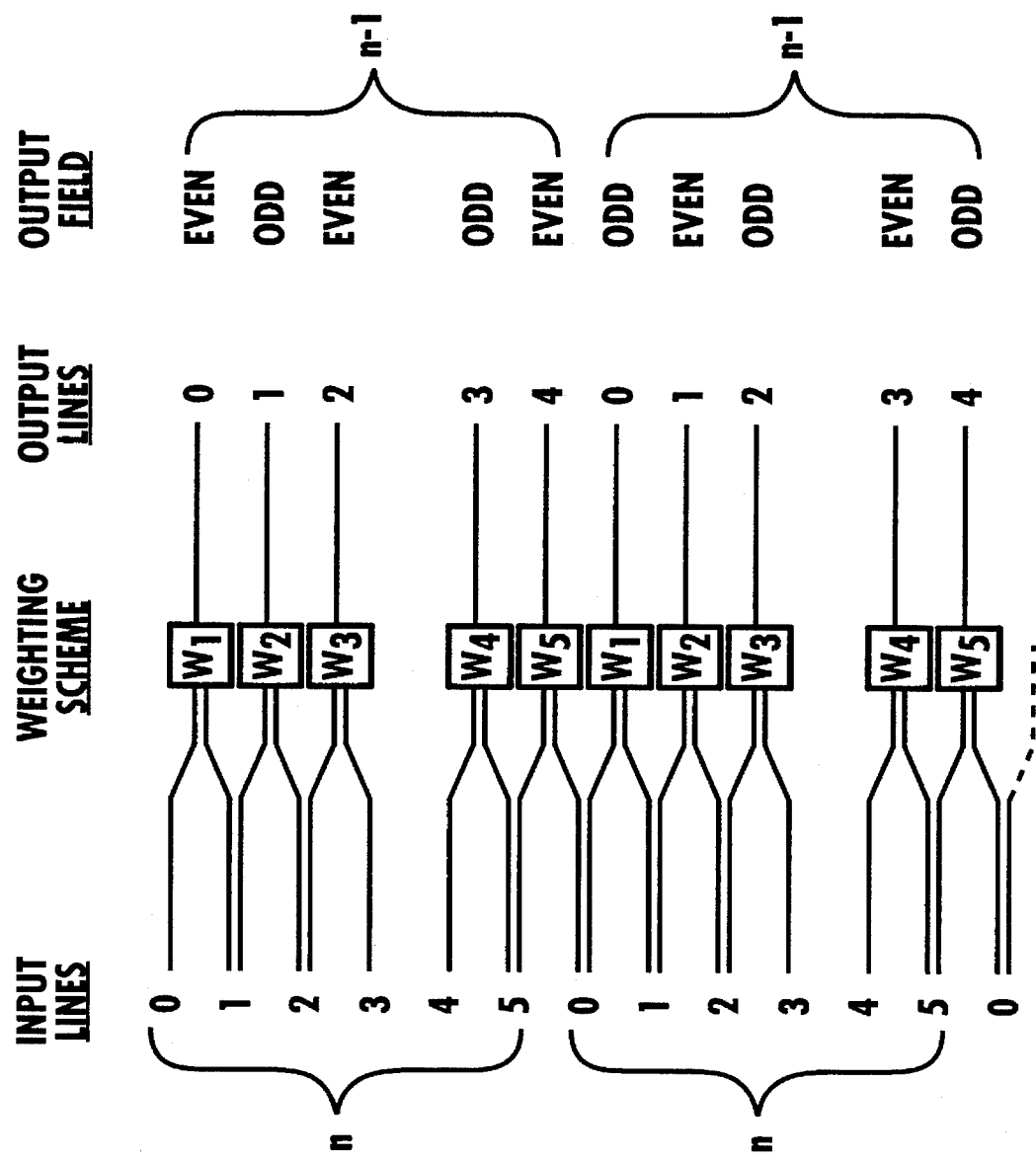

FLICKER REDUCTION AND SIZE ADJUSTMENT FOR VIDEO CONTROLLER WITH INTERLACED VIDEO OUTPUT

TECHNICAL FIELD

The present invention relates to computer video controllers, particularly VGA or SVGA video controllers having an interlaced video output. The present invention has particular application for video controllers having an interlaced video output for a television monitor or receiver.

BACKGROUND ART

Some early personal computers (PCS) made use of televisions as inexpensive output display devices. These early PCs, however, had output displays of limited resolutions and thus were suitable for the relatively low resolution of a television. For the purposes of this application, the term "television" may include, but is not limited to, NTSC, PAL or SECAM televisions, receivers, and monitors, or the like. In addition, as used herein, the term "television" may also refer to other types or formats of interlaced television displays including HDTV, either analog (e.g., MUSE) or digital.

As the resolution requirements for PCs increased, specialized monitors were developed to display higher resolution images. Many IBM™ compatible PCs utilize output displays which are so-called VGA or SVGA compatible. However, new requirements exist for a television output for a PC. So-called multimedia displays or presentations often require the use of a large video display in order to display an image to a number of people simultaneously. Large size televisions (e.g., 30" diagonal screen or the like) are readily available for such purposes. In addition, it is sometimes desirable to record the output of a PC onto videotape (e.g., VCR) for later playback, either for demonstration purposes, or to generate video programming. In addition, although PCs are found in many homes and are relatively inexpensive, a demand still exists for a relatively low cost PC for home use which could utilize existing television hardware for a video display. It should also be noted that new televideo services, such as interactive television, video-on-demand, picturephone™ or the like, may require the use of a fairly sophisticated PC in the customer home for generating a image on a television receiver.

Early PCs could generate a television output display fairly easily by using a display of limited resolution. However, with increased resolution displays (e.g., VGA, SVGA, or the like) some problems are encountered. In particular, software written for the VGA standard generally uses one of several screen resolutions (e.g., 640 by 480 pixels). On the other hand, television signals have been standardized according to several national and international conventions (e.g., National Television Systems Committee, or NTSC).

In particular, the NTSC television standard has 525 horizontal lines of analog video data divided into even and odd interlaced fields of 262.5 lines each. FIG. 5A depicts a frame of an NTSC image (or other interlaced image). Each frame of the NTSC image is comprised of interlaced even and odd fields. FIG. 5B depicts field one, the odd field which comprises odd numbered scan lines. FIG. 5C depicts field two, an even field which comprises even numbered scan lines. The two fields are interlaced to produce the composite frame in FIG. 5A. Each frame of FIG. 5A is refreshed at a frame rate, which for an NTSC image is 30 Hz. The fields are refreshed at a field rate twice the frame rate, which for an NTSC image would be 60 Hz.

Other television standards such as PAL or SECAM use similar interlacing schemes. Of the 525 horizontal lines in an NTSC video signal, some are taken up with what is known as the Vertical Blanking Interval (VBI) which includes pre-equalizing pulses (occupying three horizontal lines), the vertical sync pulse interval (occupying three horizontal lines), post-equalizing pulses (occupying three horizontal lines), and ten to fourteen non-video lines, which may be used for reference subcarrier phase, close captioning, descrambling data, or other so-called "in-band" data. As a result, of the 525 horizontal lines in an NTSC video signal, only 480 are available for active video.

These 480 lines of active video could be used to display 480 lines of pixel data from a 640 by 480 pixel resolution VGA display with relative ease. However, a television, unlike a computer monitor, uses a technique known as overscan to insure that the picture fills the entire video display (e.g., picture tube). Unfortunately, this overscan technique, when applied to the output of a PC may result in a display image having truncated upper and lower portions as well as truncated left and right portions. For a computer display image, such truncation is not acceptable, as useful information may appear in the truncated portions of the display image.

Thus, in order to display a high resolution PC video display on a television, the vertical resolution of the display may be decreased to accommodate the limitation of the television. For most commercially sold televisions, vertical overscan rarely exceeds 15%. Thus, if the PC output display image could be adapted to fit within 400 lines, all of the display image may appear on a television without being truncated due to overscan.

An additional problem is presented when attempting to display a high resolution PC video output on an interlaced video display such as a television. High resolution PCs (e.g., VGA, SVGA or the like) may store image data as individual pixel data in non-interlaced form in a video memory (VMEM). The pixel data may be scanned out of the video memory in sequence, converted into analog form, and displayed on a VGA compatible monitor. In order to generate a display image without flicker, a VGA compatible monitor may be refreshed at a relatively high refresh rate (e.g., 60 or 75 Hz) in order to take advantage of the persistence of vision phenomenon.

However, an interlaced video display such as a television may be refreshed at a lower frame rate, for example, 30 Hz. For a typical analog television signal, with relatively low resolution and contrast, such a refresh rate is acceptable for viewing without perceptible flicker. However, a computer display image such as a graphics display image may include a high contrast image having a horizontal line or edge which is one pixel (i.e., one horizontal line) in height. Such a line may only appear on one of two interlaced (even and odd) fields and thus may be refreshed only once per frame. For the viewer, such lines or edges may have a perceptible flicker which may make viewing the image annoying and disorienting. In general, it has been noted that such flicker effects are usually found at horizontal edges or in thin horizontal lines where the intensity or color of the line or edge is substantially different from an adjacent line in the opposite field (i.e., high contrast areas). For example, a black horizontal line on a white background may exhibit such a flicker effect.

One technique for reducing flicker involves averaging or otherwise combining each line of an interlaced display with a portion of one or more adjacent lines so as to reduce the apparent contrast between adjacent lines and thus reduce flicker. However, for a high resolution display such as a VGA display, such a technique may be difficult to implement without the use of additional components. Digital pixel data in a VGA display typically represents an address in a color look up table (LUT). The data at an address in the color look up table (LUT) represents RGB pixel data. RGB pixel data in turn drives a digital to analog converter (DAC) to output an analog pixel signal. As the digital pixel data may represent only a look up table address, it may be difficult to combine digital pixel data from adjacent lines to output a correct averaged color hybrid line. Thus, it is usually necessary to convert digital pixel data into RGB pixel data before averaging or combining pixel data from adjacent lines.

For example, for a VGA standard video controller, shown in FIG. 1, digital pixel data may be generated from VMEM 10 using eight bits to represent each pixel, for a total of $2^8$ or 256 possible colors. This eight-bit digital pixel data may then be fed, through FIFO 15, as an address to color look up table (LUT or RAM) 20 which outputs as data from that address an eighteen-bit RGB value. The eighteen-bit RGB value may comprise three groups of six bits each, or any other hardware specific implementation. Each group may represent an intensity value for one color (Red, Blue or Green). These RGB values may then be fed to a digital to analog converter (DAC) 30 which typically may comprise three groups of six current sources, selectively engaged by the three six-bit groups of RGB data, to generate corresponding analog outputs. These analog values may then generate pixels on video display 40, which may comprise an analog CRT monitor such as a VGA monitor or the like. The contents of look up table LUT 20 may be changed (e.g., through software) such that any 256 colors of a possible $2^{18}$ or 256 thousand colors may be displayed simultaneously.

For the purposes of illustration, pixel data stored in video memory is shown as eight-bit pixel data. It should be appreciated that a greater or lesser number of bits may be used (as is known in the art) to represent pixel data. Similarly, for the purposes of illustration, RGB data is shown as eighteen-bit data. However, as is know in the art, other numbers of bits may be used to represent RGB data. For example, twenty-four-bit RGB data may be used to provide a possible $2^{24}$ or 16 million colors. A lesser number of bits may be used for RGB pixel data as well. In addition, look up table LUT 20 may be programmed such that RGB data output from look up table LUT 20 is eight-bit data identical to the eight-bit pixel data input to look up table LUT 20. It should also be noted that although the pixel output data is shown as RGB data, other formats for pixel output data (e.g., YUV) may be used.

Thus, in order to accurately combine adjacent line information, it usually necessary to first determine RGB output values for each line or pixel to be combined. One method for averaging or combining RGB pixel data is to provide duplicate look up tables to simultaneously convert pixel data from adjacent lines into RGB pixel data.

One such system is shown in Futscher, U.S. Pat. No. 5,182,643, issued Jan. 26, 1993 and incorporated herein by reference. Futscher buffers adjacent lines of non-interlaced horizontal input video and combines the lines using time division multiplexing on a pixel by pixel basis to produce an interlaced digital output signal.

FIG. 2 illustrates one embodiment of the Futscher apparatus. Interlaced digital video is clocked into multiplexor 335 and the field buffer 360 at the pixel clock rate. The field buffer 360 is first loaded with all odd lines in a frame, then with all even lines in a frame. The output of field buffer 360 is clocked out at the pixel clock rate and is fed to multiplexor 335 and line buffer 305. The line buffer has the effect of delaying its output by one line period. Thus, for each line of interlaced digital video input to multiplexor 335, field buffer 360 and line buffer 305 present data from adjacent lines.

Multiplexor 335 outputs a multiplexed signal which is composed of alternate pixels from field buffer 360 and line buffer 305 clocked at twice the output video horizontal sweep rate. Flicker reduction is achieved by time division multiplexing the video output signal. Due to the analog nature of the DAC output, the output signal will be an analog average of the multiplexed input signals.

The data stored in field buffer 360 and line buffer 305, is digital pixel data (i.e., color look up table addresses) which by itself is difficult to combine digitally to reduce flicker. Since digital pixel data is not analogous to color, combining look up table addresses may not produce consistent results.

While the technique of Futscher may reduce flicker, the system requires the use of a buffer 305 and field buffer 360 to store adjacent line data. This technique adds additional hardware for the output stage of the video controller. In addition, while Futscher's apparatus may reduce flicker, Futscher does not address the scaling problem created when attempting to display a VGA display on a television screen. Further, it appears that each embodiment of Futscher may generate only one type of adjacent line combining technique without hardware reconfiguration.

SUMMARY OF THE INVENTION

It is an object of the present invention to reduce flicker in a video controller having an interlaced video output.

It is a further object of the present invention to reduce the number of components in a video controller having an interlaced video output with reduced flicker.

It is a further object of the present invention to allow for multiple flicker reduction schemes in a video controller having an interlaced video output.

It is a further object of the present invention to provide a video vertical size adjustment in a video controller.

It is a further object of the present invention to provide a video size adjustment in a video controller having an interlaced video output with flicker reduction.

The present invention includes an apparatus for generating an interlaced video display image from a source image stored as a number of horizontal scan lines of pixel data in a video memory. A controller selectively reads from the video memory first pixel data from a first horizontal scan line of the source image and second pixel data from a second horizontal scan line of the source image. A first FIFO stores first pixel data from a portion of a first horizontal line of the source image. A second FIFO stores second pixel data from a portion of a second horizontal line of the source image. A multiplexor receives and multiplexes the first pixel data and the second pixel data and outputs multiplexed pixel data.

A look up table converts the first pixel data to first output pixel data and the second pixel data to second output pixel data. A first latch latches the first output pixel data, while a second latch latches the second output pixel data. A weighting control receives the first output pixel data and said second output pixel data and outputs hybrid pixel data as a weighted value of at least the first output pixel data and the second output pixel data.

In one embodiment, the weighting control may output hybrid pixel data comprising a plurality of color data, each of which represents an average of corresponding color data from the first output pixel data and the second output pixel data. In another embodiment, the weighting control may output hybrid pixel data comprising a plurality of color data, from each of which represents five-eights the value of corresponding color data the first output pixel data and three-eights the value of corresponding color data from the second output pixel data.

In yet another embodiment, the data stored in the video memory may comprise a plurality of horizontal scan lines of pixel data, and the weighting control may compute a weighted value of at least the first output pixel data and the second output pixel data according to at least one of a predetermined number of weighting schemes. Each of the predetermined number of weighting schemes may be applied to pixel data from successive pairs of horizontal scan lines. The predetermined number of weighting schemes may comprise n−1 weighting schemes applied to pixel data from successive pairs of horizontal scan lines selected from groups of n+1 successive horizontal scan lines such that for each n horizontal scan lines of pixel data read from the video memory, the weighting control outputs n−1 horizontal scan lines of hybrid pixel data so as to vertically scale the source image by a ratio of n:n−1. It should be appreciated that the number of scan lines n read from the video memory is preferably a number much less than the total number of scan lines in a frame. In the preferred embodiment, n equals six.

In addition, a luminance value generator may be provided for calculating luminance values for first and second output pixel data. A luminance storage buffer stores at least one of these calculated luminance values. A luminance adjustment control calculates a luminance adjustment factor from calculated luminance values for first and second output pixel data and a previously stored luminance value for pixel data from a line adjacent to the first or second horizontal scan lines. The weighting control then selectively generates the hybrid output pixel data as a weighted average of the first output pixel data from a first input line, said second output pixel data from a second input line, and the luminance adjustment factor from a third input line. Output pixel data for a respective first or second scan lines may be adjusted by adding or subtracting a predetermined value from color data corresponding to the output pixel data in accordance with the relative contrast between output pixel data from the first scan line, the second scan line and an third scan line adjacent the first or second scan lines.

BRIEF DESCRIPTION OF DRAWINGS

Other objects and advantages of the method and apparatus of the invention will be apparent from the following description and drawings in which:

FIG. 6 is a table summarizing the overall weighting scheme and addressing mode for the second embodiment of the present invention.

FIG. 7A is a table illustrating the locations of discontinuities in a first embodiment of five weighting schemes.

DETAILED DESCRIPTION OF THE DRAWINGS

Figure 3:
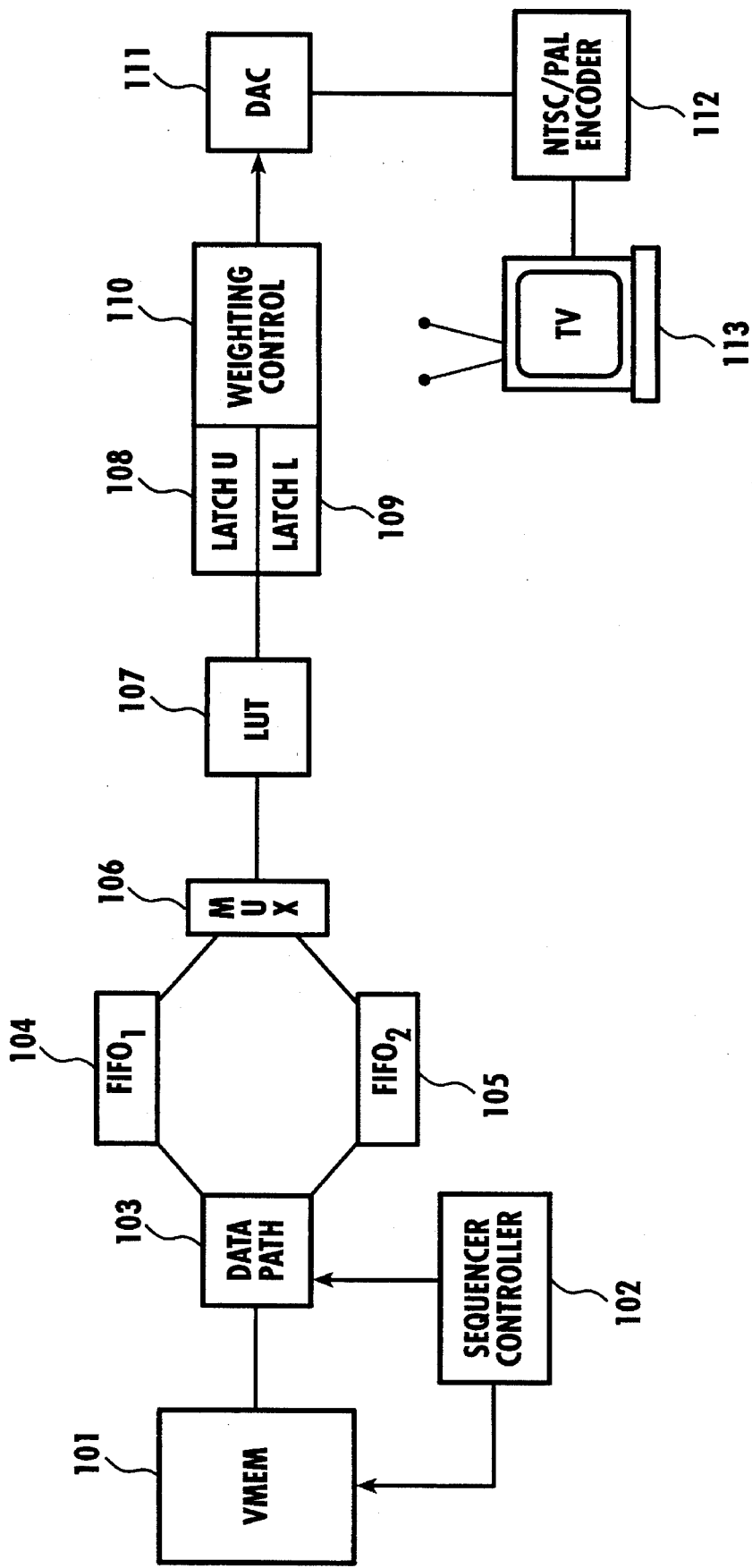
FIG. 3 is a block diagram of a first embodiment of the present invention providing flicker reduction for an interlaced video display.

FIG. 3 illustrates a first embodiment of the present invention for reducing flicker in an interlaced video display. Referring now to FIG. 3, pixel data representing a video image is stored in video memory VMEM 101. Pixel data may be stored in video memory VMEM 101 from a host processor (not shown) as is known in the art. Pixel data stored in video memory VMEM 101 may comprise, for example, eight-bit pixel data comprising a number of eight-bit bytes, each representing a pixel color. It should be appreciated that other numbers of bits per pixel (i.e., pixel depth) may be used without departing from the spirit and scope of the invention. Further, other methods of storing pixel information may be used (e.g., text modes or the like) with suitable modification to the apparatus of the present invention.

Sequence controller 102 may be provided to read data from video memory VMEM 101. In prior art controllers, sequence controller 102 generally reads pixel data from video memory 101 in a sequential fashion, with each sequential address in video memory VMEM 101 representing a sequential pixel in a video display image. In the present invention, sequence controller 102 may be selectively programmed to provide such a conventional non-interlaced display.

Figure 1:
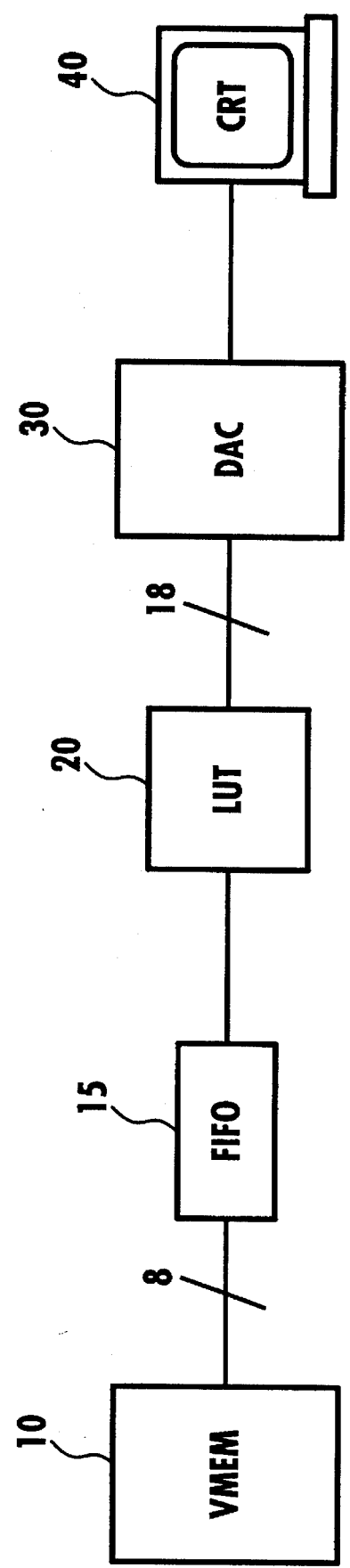
FIG. 1 is a block diagram of a prior art video controller, video memory and display.
Figure 2:
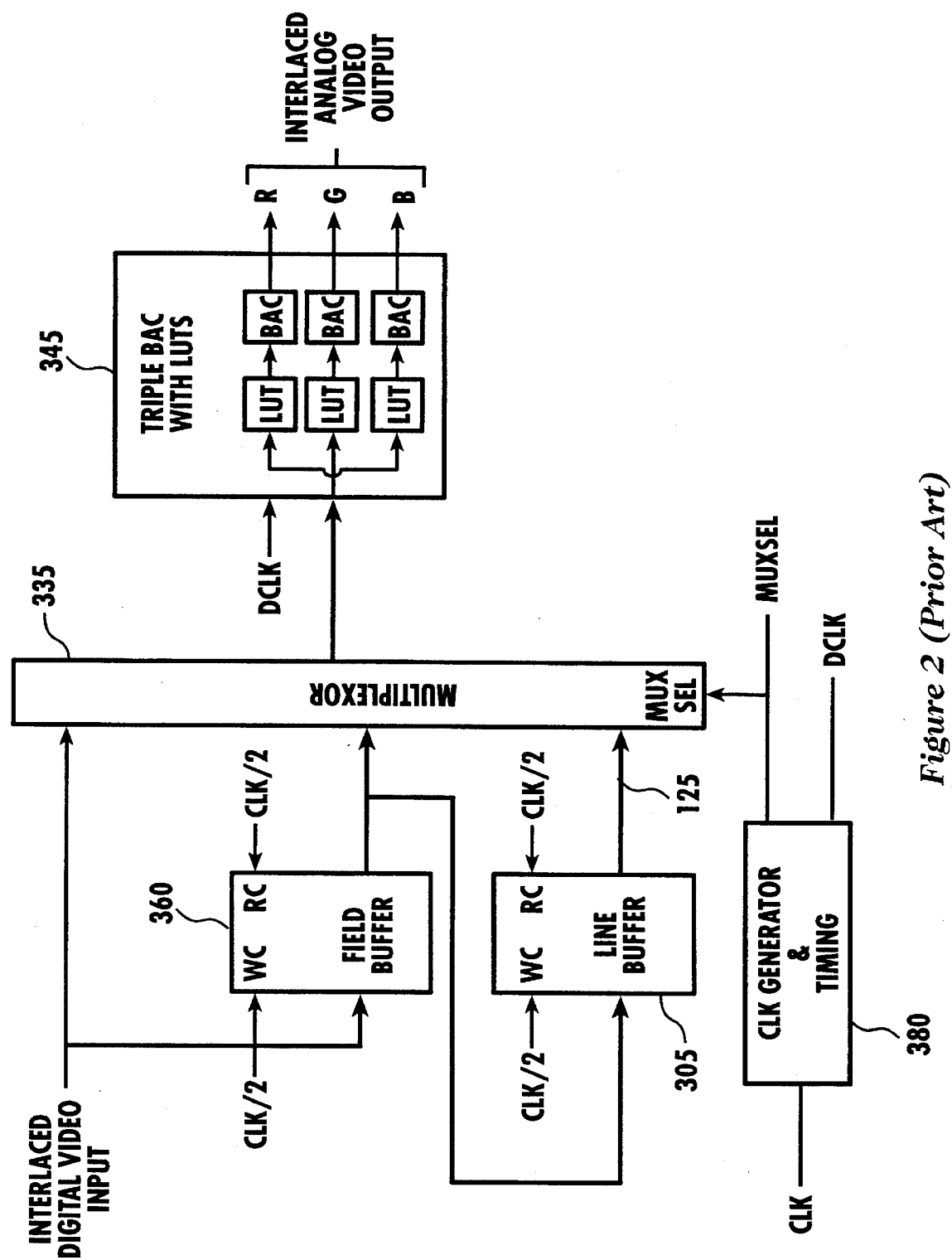
FIG. 2 is a block diagram of a prior art video controller disclosed in U.S. Pat. No. 5,182,643.

However, if an interlaced display is to be generated, sequence controller 102 may be selectively programmed to read pixel data from video memory VMEM 101 in a non-serial fashion. For an interlaced video display, sequence controller 102 may alternately read pixel data from two or more adjacent scan lines and control data path 103 to direct the pixel data into one of two FIFOs 104 and 105. In a prior art video controller, such as that shown in FIG. 1, FIFO 15 may be required in order to buffer data output of video memory VMEM 10. Thus, the use of two FIFOs 104 and 105 in the embodiment of FIG. 3 does not present substantial additional hardware to the design.

FIFOs 104 and 105 may be formed by partitioning (through software) FIFO 15 into two FIFOs 104 and 105. In a prior art video controller, FIFO 15 may be 32 bits wide and sixteen levels deep. In the embodiment of FIG. 3, FIFO 15 may be partitioned into two FIFOs 104 and 105, each 32 bits wide and eight levels deep. Thus, each FIFO 104 and 105 may hold up to eight 32 bit D-words. Up to 32 bytes of pixel data from one scan line may be read from video memory VMEM 101 during a read cycle and stored in FIFO 104 or 105. Of course, other appropriately sized FIFOs may be applied without departing from the spirit and scope of the invention.

The depth of FIFOs 104 and 105 may be determined by a number of factors, depending on the read mode of video memory VMEM 101 and timing delays in the video controller. Sequence controller 102 may read pixel data from video memory VMEM 101 on a pixel by pixel basis, or as groups of pixels (e.g., page mode). For example, sequence controller 102 may read four pixels from the first scan line in video memory VMEM 101 and then read four pixels from the second scan line in video memory VMEM 101. The memory locations between the first and second scan lines may be readily determined by calculating a simple offset. For example, for a 480 by 640 pixel display, pixel data for the second scan line may be located 640 addresses (or similar offset) from pixel data for the first scan line.

Thus, the embodiment of FIG. 3 may be enabled without any additional hardware requirements. It should be appreciated that, although two FIFOs are shown here, a greater number of FIFOs may be used to read data from additional scan lines for alternate weighting schemes. Since sequence controller 102 has been reprogrammed to alternately read data for adjacent lines, it is unnecessary to provide a line buffer to store the contents of entire adjacent lines. Thus, FIFOs 104 and 105 may be provided at a relatively economical cost.

Data is then alternately read from FIFOs 104 and 105 and multiplexed by MUX 106. The output of MUX 106 may comprise an interleaved data stream of eight-bit pixel data, including pixel data for a first (upper) scan line and pixel data for a second (lower) adjacent scan line. The interleaved pixel data is fed to look up table LUT 107 where it is converted into RGB pixel data. In the example shown here, this RGB pixel data may comprise eighteen-bit pixel data, however, other numbers of bits for RGB pixel data may be used without departing from the spirit and scope of the invention.

RGB pixel data from look up table LUT 107 may then be fed to latches 108 and 109, each of which may store RGB data representing pixels from adjacent lines. For example, for an even field, register 108 may store one eighteen bit RGB pixel word for one line, whereas register 109 may store an eighteen bit pixel word for an adjacent odd line.

The contents of latches 108 and 109 are then manipulated by weighting control 110 to produce hybrid weighted RGB pixel data. Weighting control 110 may be programmed with one or more weighting schemes to reduce flicker while minimizing degradation in resolution or contrast. Weighting control 110 may utilize different weighting schemes for different types of picture displays (e.g., Motion Video, graphics, text, or the like) to produce optimum resolution and contrast while reducing flicker. The weighting scheme used for flicker reduction may be enabled by setting a bit or bits in a data register within the video controller, or by an other programmable means known in the art.

For maximum flicker reduction, weighting control 110 averages the contents of latches 108 and 109 to produce output hybrid RGB pixel data. The data for each color (Red, Blue, Green) is averaged separately, as follows:

$$OUT_p = U_p/2 + L_p/2 \qquad (1)$$

Where p is a pixel number (e.g., 0 to 319 for a display having a 320 pixel horizontal resolution). OUT represents the output value for one color (Red, Blue, Green) of RGB pixel data. U is an upper line from a non-interlaced source, and L is the lower adjacent line from the non-interlaced source. Each field (even or odd) is generated in sequence. In each field, output lines may be generated from pairs of input lines.

The lines used as upper (U) and lower (L) lines for the weighting scheme discussed above are those lines stored in latches 108 and 109. Thus, the determination of upper (U) and lower (L) lines for each output scan line in the weighting scheme is dependent on the addressing mode used by sequence controller 102.

Several addressing modes may be used to weight different lines. In prior art interlaced display devices, the addressing mode of Table 1 has been used to average data from adjacent lines. In Table 1, pixel data from adjacent lines may be averaged to produce hybrid output pixel data for both even and odd fields. As shown in Table 1, the hybrid output pixel data for both even and odd fields may be identical. While such an addressing mode may eliminate flicker (by replicating lines in the even and odd fields) it is readily apparent that the addressing scheme of Table 1 reduces vertical resolution by half.

TABLE 1

| (Prior Art) | | | | |
|---|---|---|---|---|
| Even Field Input Lines | | Odd Field Input Lines | | Even/odd Field Output |
| U | L | U | L | Line |
| 0 | 1 | 0 | 1 | 0 |
| 2 | 3 | 2 | 3 | 1 |
| 4 | 5 | 4 | 5 | 2 |
| 6 | 7 | 6 | 7 | 3 |
| 8 | 9 | 8 | 9 | 4 |
| ... | | ... | | ... |
| 478 | 479 | 478 | 479 | 239 |

In order to reduce flicker without sacrificing as much vertical resolution, the addressing mode shown in Table 2 below was devised to provide optimal flicker reduction for a given weighting scheme while minimizing reduction in vertical resolution.

TABLE 2

| Even Field Input Lines | | Odd Field Input Lines | | Even/odd Field Output |
|---|---|---|---|---|
| U | L | U | L | Line |
| 0 | 1 | 1 | 2 | 0 |
| 2 | 3 | 3 | 4 | 1 |
| 4 | 5 | 5 | 6 | 2 |
| 6 | 7 | 7 | 8 | 3 |
| 8 | 9 | 9 | 10 | 4 |
| ... | | ... | | ... |
| 479 | 479 | 479 | 479 | 239 |

In the addressing scheme of Table 2, each line from the non-interlaced input image is weighted with an adjacent line. Thus, for example, the first pixel in the line 0 of the even field of an interlaced output display image may have color values which will be the average of the color values from the first pixel in line 0 of the non-interlaced source image and the first pixel in line 1 of the non-interlaced source image. Similarly, the first pixel in line 0 of the odd field of the interlaced output display image may have color values which will be the average of the color values from the first pixel in line 1 of the non-interlaced source image and the first pixel in line 2 of the non-interlaced source image. The remaining pixels may be averaged in a similar manner. The example shown in Table 2 is for a 480 line non-interlaced input image. However, the addressing mode of Table 2 may also be applied to input images having different numbers of lines.

Using weighting scheme (1) with the addressing mode of Table 2, the contrast between each field (even or odd) is reduced below the threshold where flicker may be perceived. While such a technique results in maximum flicker reduction, it is apparent that the technique may also reduce vertical resolution and contrast. Other weighting schemes may be used to reduce flicker without sacrificing as much vertical resolution or contrast. One scheme weights pixel values according to the following weighting scheme:

$$OUT_p = U_p/2 + U_p/8 + L_p/4 + L_p/8 \qquad (2)$$

Here again, p represents pixel number, OUT the output value for one color of an output pixel, U an upper line, and L a lower line. Weighting scheme (2) results in an output pixel having a weighted valued equal to 5/8 the color value of the upper line, and 3/8 the color value of the lower line. Weighting scheme (2), while not providing maximum flicker reduction, may provide better contrast and resolution that weighting scheme (1). Different weighting schemes may be selectively enabled within weighting control 110 by register bit or the like, to provide different levels of flicker reduction and/or contrast and resolution depending upon picture content. It should be appreciated that other weighting schemes may be utilized without departing from the spirit and scope of the invention.

After the RGB pixel data has been weighted, the output RGB pixel data is then fed to digital to analog converter DAC 111 and converted into analog RGB signals in a manner similar to that known in the art. The analog RGB output, combined with a TTL composite sync (not shown) may then be converted into an interlaced analog format such as NTSC or PAL in NTSC/PAL converter 112. NTSC/PAL converter 112 converts the RGB analog input, along with the TTL composite sync into a composite video signal. Such NTSC/PAL converters are well known in the art and are commercially available from many manufacturers. An example of such a converter is the model AD720 manufactured by Analog Devices™ of Norwood, Mass.

The composite video signal may be fed to interlaced display 113 if interlaced display 113 is provided with a composite video input. Alternately, the output of NTSC/PAL converter 112 may be RF modulated and fed to an RF input of interlaced display 113. For the purposes of illustration, the interlaced display is shown as a television. However, other types of interlaced displays (e.g., interlaced monitor or the like) may be used with the present invention without departing from the spirit and scope of the present invention.

Thus, the first embodiment of present invention provides flicker reduction for an interlaced video display without a substantial increase in hardware. By utilizing the sequence controller to selectively read data from the video memory, the need for expensive line stores is eliminated. Only two small FIFOs (or one partitioned FIFO) are needed to store pixel data prior to being multiplexed. Similarly, by multiplexing the pixel data, the need to replicate the contents of look up table LUT 107 in a separate look up table is eliminated. By placing the weighting control between the look up table LUT 107 and digital to analog converter DAC 111, the need for second digital to analog converter is also eliminated. In addition, the arrangement of the hardware allows for the use of multiple weighting schemes without the need for extensive hardware changes.

Weighting schemes (1) and (2) As discussed above, provide flicker reduction for an interlaced display which may be suitable where either no vertical size adjustment is required, or only size enlargement is required. For example, if interlaced display 113 is an NTSC television receiver or monitor, a total of 400 vertical lines are available for video display, allowing for the Vertical Blanking Interval (VBI) and vertical overscan. If the non-interlaced video image source has a vertical pixel resolution less than 400 lines, individual lines may be replicated to expand the image.

For example, an image having a resolution of 320 by 200 pixels (i.e., VGA Mode "D") each line may be double scanned to produce a 400 line display. For other resolutions, such as 640 by 350 pixels, (e.g., VGA mode "10") lines may be proportionally scanned to produce a 400 line display (i.e., every seventh line may be double scanned).

Horizontal resolution may be readily adapted by altering the dot clock output for the analog display to stretch or shrink the length of each pixel on a horizontal line to a desired width. Alternatively, similar replication schemes may be used to stretch the image to a desired width.

However, if the vertical resolution is to be decreased, different techniques may be required. For example, for an image having a 640 by 480 pixel resolution (e.g., VGA mode "12"), the number of vertical lines may be reduced from 480 lines to 400 lines. As discussed above, due to overscan, the output video image for an NTSC television receiver or monitor may have as few as 400 lines of displayed video. One approach to decreasing the vertical resolution would be to simply eliminate a proportional number of lines from the display. For example, if every sixth line were deleted or skipped, a 480 line display could be scanned out as a 400 line display (e.g, 6:5 reduction). While such a technique may be suitable for some applications (e.g., live action video), it may be entirely unsuitable for others. For example, in computer graphics applications, an element of the displayed image may have a thickness of only one scan line (e.g., line drawing). If such information were skipped or deleted, the resulting image would be incomplete and inaccurate.

Different weighting schemes and addressing modes may be applied to the apparatus of FIG. 3 in order to scale a 480 line image to a 400 line image while minimizing the loss of image information. Rather than providing one weighting scheme for all lines, a number of different schemes, or filters may be provided for each output line within a group of output lines. As discussed above, to reduce a 480 line image to a 400 line image, every six lines of the non-interlaced input image must be reduced to five lines in the output image. Thus, five weighting schemes or filters may be provided within weighting control 118 to generate five output lines from six input lines read from video memory 101.

As before, pixels from horizontal lines may be read into FIFOs 104 and 105 through data path 103 by sequence controller 102. This eight-bit pixel data may then be multiplexed and then converted in look up table LUT 107 into eighteen-bit RGB pixel data. As before, upper and lower RGB pixel data are stored in latches 108 and 109, respectively. However, in order to enable vertical resolution scaling, a different weighting scheme or filter may be enabled for each line in every group of five output lines. A first embodiment of five weighting schemes are as follows;

$OUT1_p = U_p/2 + L_p/2$ lines 0 & 1
$OUT2_p = U_p/4 + U_p/8 + L_p/2 + L_p/8$ lines 1 & 2
$OUT3_p = U_p/4 + L_p/2 + L_p/4$ lines 2 & 3
$OUT4_p = U_p/2 + U_p/4 + L_p/4$ lines 4 & 5
$OUT5_p = U_p/2 + U_p/8 + L_p4 + L_p/8$ lines 5 & 0'

Again, p represents pixel number (e.g., 0 to 639), U represents upper line and L represents lower line. OUT represents the output value for one color (Red, Blue, Green) of a given pixel (subscript n). Each filter is assigned a filter number 1 through 5 (OUT1 through OUT5). To the right of each filter equation is shown the line numbers for the upper and lower lines taken from each group of six lines for which each filter may be applied. The addressing mode is similar to that used for weighting schemes (1) and (2). Line 0' represents line 0 of the next group of six lines.

For a group of six lines (0 through 5), the first odd output line, using filter 1, will be an average of the color values of lines 0 and 1. The first even field output line, using filter 2, will comprise a hybrid line having a weighted value equal to ¾ the value for input line 3 and ¼ of the values for input line 2. The second odd field output line, using filter 3, will comprise a hybrid line having a weighted value equal to ⅝ the value for input line 3 and ⅜ of the values for input line 2. The second even field output line, using filter 4, will comprise a hybrid line having a weighted value equal to ¾ the value for input line 4 and ¼ of the values for input line 3. The third odd field output line, using filter 5, will comprise a hybrid line having a weighted value equal to ⅝ the value for input line 5 and ⅜ of the values for input line 0'—line 0 for the next group of six lines.

Note that the filters are not applied in the sequence shown above, but rather odd field lines are scanned first, then even field lines, and so on. Note also that the filters are rotated for each successive group of five output lines. Thus, for the next group of five output lines, filters 1, 3, and 5 will be applied to even lines, while filters 2 and 4 are applied to odd lines. Thus, the above five filters may be generally applied in a repeating sequence (1, 3, 5, 2, 4, . .) in weighting control 110 for each field of an input image.

Two features of the first embodiment of the five weighting schemes should be noted. First, RGB pixel data for the last line of each group of six input lines is weighted with RGB pixel data from the first line of the next group of six lines. Second, RGB pixel data for each adjacent line in the scheme is weighted with RGB pixel data for its adjacent line, with the exception of input lines 3 and 4. Such a discontinuity is necessary in order to reduce the number of output lines from six to five. The discontinuity is placed between input lines 3 and 4 to prevent the discontinuity from falling at the boundary of the six line group (i.e., line 5 and line 0').

FIG. 7A further illustrates the location of the discontinuity. Referring now to FIG. 7A, a number of groups of six input lines 0 through 5 are represented in the right hand column. In the first middle column, the weighting schemes or filters 1–5 are shown as $W_1$ through $W_5$. In the second middle column, the numbering for groups of five output lines 0 through 4 are shown. In the right hand column is indicated whether a given output line is for an even or odd field. Lines connecting the numbers of input lines to weighting schemes to output lines represent the data path for each output line. The discontinuity between the third and fourth output lines (lines 2 and 3) is clearly illustrated in FIG. 7A. Note that for a given n input lines, a total of n−1 lines are output. Here n equals six.

Note that since RGB pixel data for lines 3 and 4 are not weighted together, it is possible that a contrast condition may exist between an output line generated by filter 3 and an output line generated by filter 4. Thus, while the above scaling technique may be suitable for scaling low contrast displays (e.g., live action video, multimedia, or the like), some flicker effects may be produced between output lines produced by filter 3 and filter 4 for graphics displays, especially if a line or edge is generated at the boundary of output lines generated by filters 3 and 4. In addition, since the weighting scheme for each line are not optimized for maximum flicker reduction (as in weighting scheme (1) discussed above) some flicker may be detected in other pairs of output lines as well.

A second embodiment of five weighting schemes, similar to weighting scheme (1) discussed above, may be applied to minimize contrast between adjacent lines. The second embodiment of five weighting schemes is as follows:

$OUT1_p = U_p/2 + L_p/2$ lines 0 & 1
$OUT2_p = U_p/2 + L_p/2$ lines 1 & 2
$OUT3_p = U_p/2 + L_p/2$ lines 2 & 3
$OUT4_p = U_p/2 + L_p/2$ lines 3 & 4
$OUT5_p = U_p/2 + L_p/2$ lines 4 & 5

Here, the weighting of individual lines is set such that hybrid pixel data for each output line is an average of the values for the RGB pixel data of the two adjacent lines. Thus, flicker between adjacent lines may be minimized. Note, however, that a discontinuity exists between the boundaries of each six line group, as RGB pixel data for input line 5 of each group is not weighted with RGB pixel data for input line 0' of the next group of six input lines.

Figure 7B:
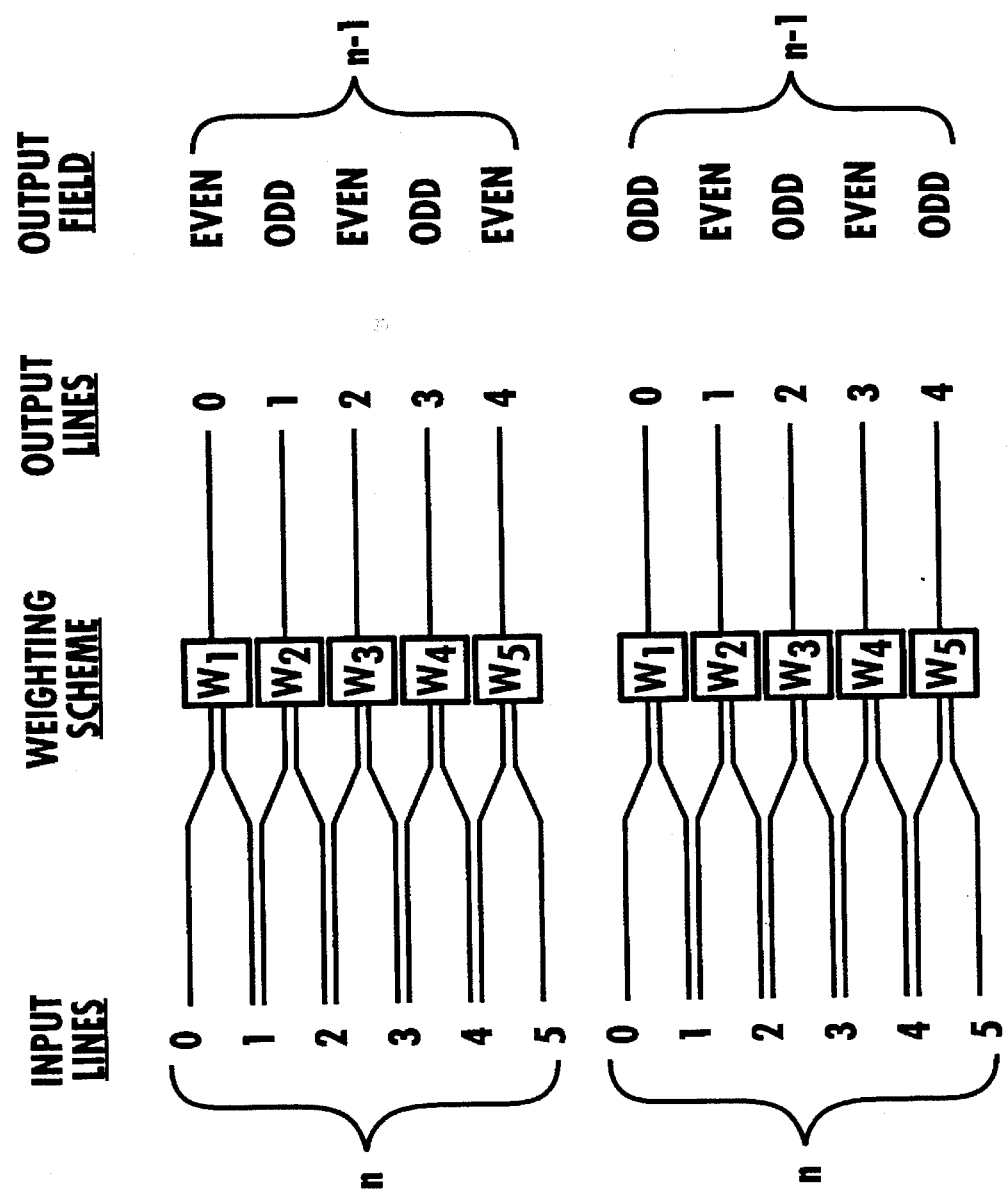
FIG. 7B is a table illustrating the locations of discontinuities in a second embodiment of five weighting schemes.

FIG. 7B further illustrates the location of the discontinuity for the second embodiment of five weighting schemes. Referring now to FIG. 7B a number of groups of six input lines 0 through 5 are represented in the right hand column. In the first middle column, the weighting schemes or filters 1–5 are shown as $W_1$ through $W_5$. In the second middle column, the numbering for groups of five output lines 0 through 4 are shown. In the right hand column is indicated whether a given output line is for an even or odd field. Lines connecting the numbers of input lines to weighting schemes to output lines represent the data path for each output line. The discontinuity between the last line in each group of five lines (line 4) and the first line in each group of five line (line 0) is clearly illustrated in FIG. 7B. Note that for a given n input lines, a total of n−1 lines are output. Here n equals six.

In order to eliminate such discontinuities and provide both scaling and flicker reduction, it may be desirable to provide data from a third pixel line during the weighting process. One solution would be to add an additional FIFO and register to store additional pixel data from a third input line. However, such a technique would require substantial additional hardware. It has been determined empirically that flicker reduction is less dependent on relative color value contrast between adjacent lines (i.e., Red, Blue, Green) than absolute luminance (Y) value contrast between adjacent lines. Thus, in the second embodiment of the present invention, shown in FIG. 4, RGB pixel data at the discontinuity may be weighted with luminance data from pixels in a third line in order to provide scaling and flicker reduction.

Figure 4:
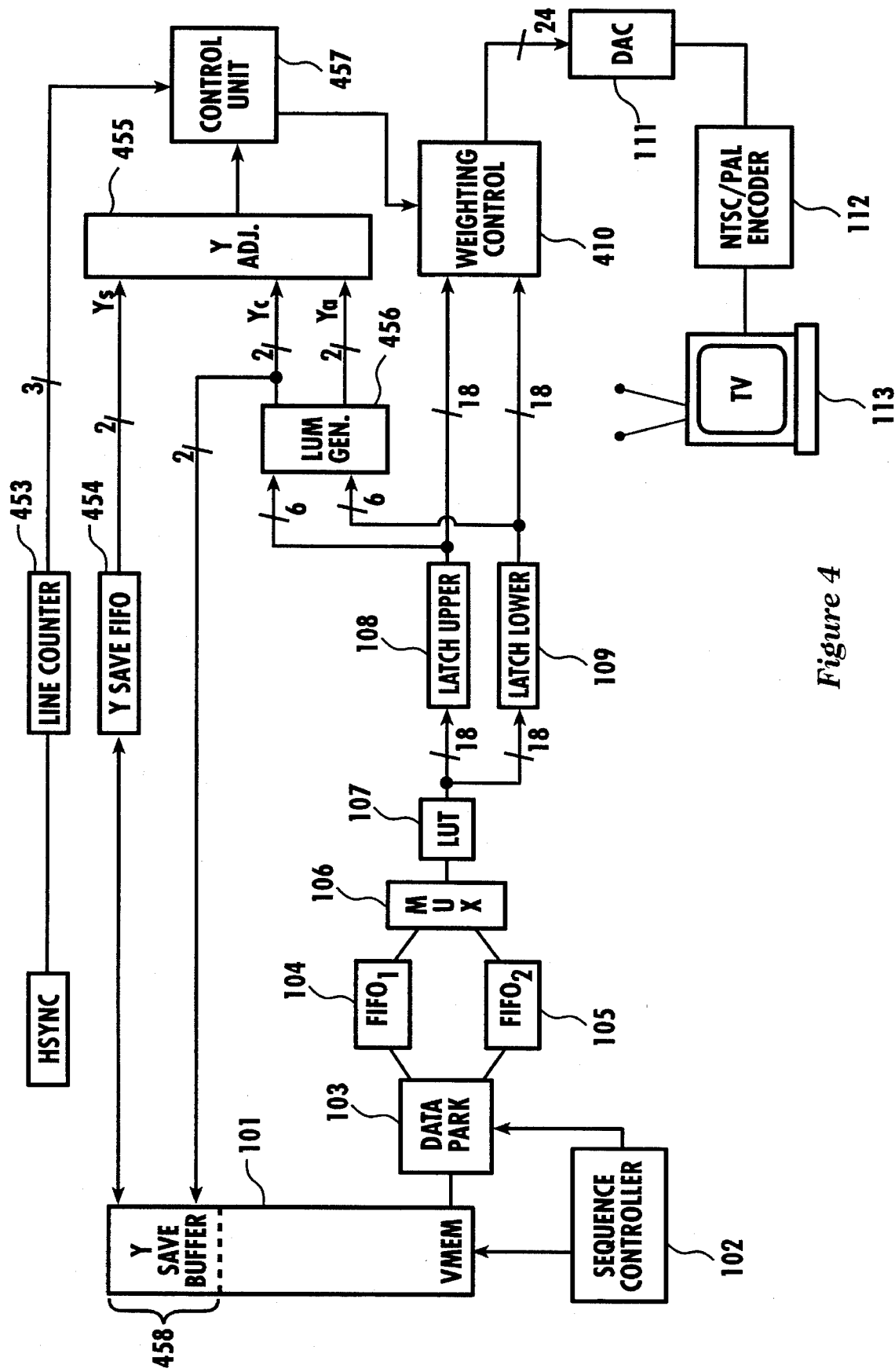
FIG. 4 is a block diagram of a second embodiment of the present invention providing flicker reduction and size adjustment for an interlaced video display.
Figure 5B:
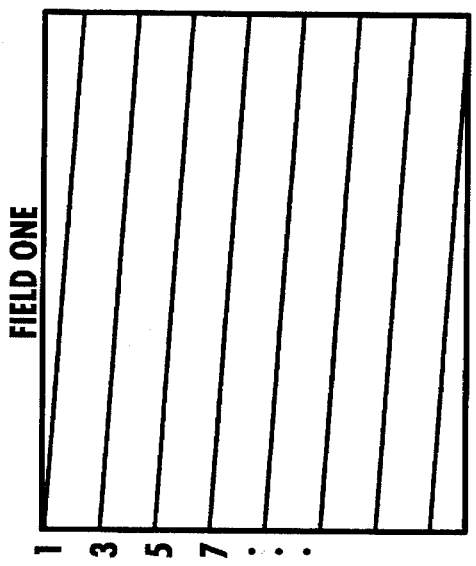
FIG. 5B depicts an odd field of a prior art interlaced display image.
Figure 5C:
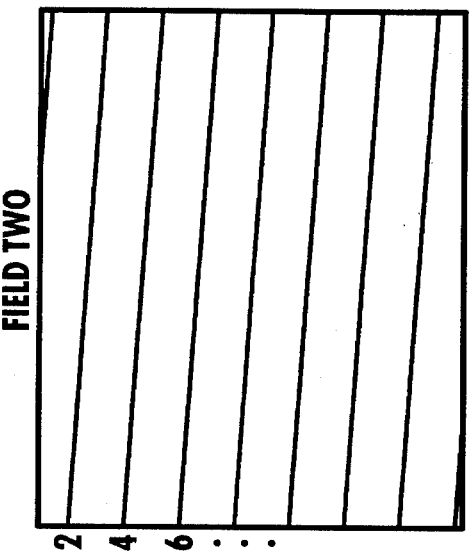
FIG. 5C depicts an even field of a prior art interlaced display image.
Figure 5A:
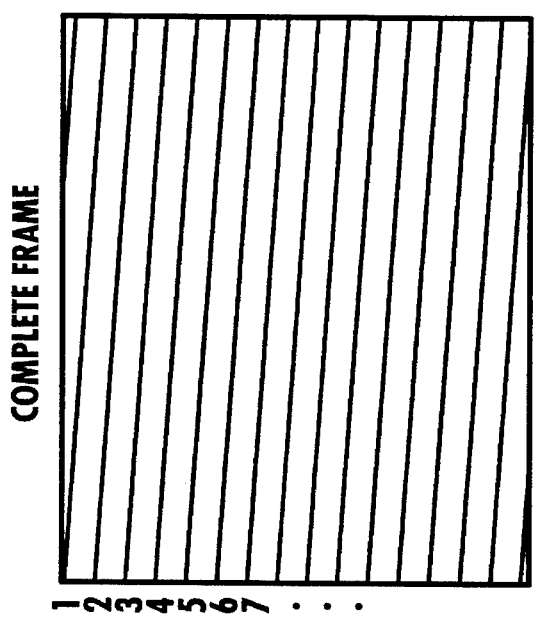
FIG. 5A depicts a frame of a prior art interlaced display image.

Referring now to FIG. 4, a non-interlaced source image data may be stored, for example, as eight-bit pixel data, in video memory VMEM 101. As in the embodiment of FIG. 3, sequence controller 101 controls data path 103 to place pixel data from different lines of the non-interlaced input image into adjacent lines in FIFOs 104 and 105. Pixel data from FIFOs 104 and 105 may then be multiplexed in MUX 105 and converted into RGB pixel data in look up table LUT 107. Pixel data for upper and lower lines are individually latched in upper and lower latches 108 and 109.

The upper and lower RGB pixel data may then be fed into luminance generator 456. Luminance generator 456 may generate luminance (Y) values from the upper and lower RGB pixel data using a standard RGB to YUV conversion known in the art. Alternately, a simplified luminance conversion may be used as discussed below.

A third embodiment of weighting schemes or filters for use in the embodiment of FIG. 4 may be as follows:

$OUT1_p = U_p/2 + L_p/2$ lines 0 & 1
$OUT2_p = U_p/2 + L_p/2$ lines 1 & 2

$OUT3_p = U_p/2 + (L_p@ADJ)$ lines 2 & 3
$OUT4_p = L_p/2 + (U_p@ADJ)$ lines 4 & 5
$OUT5_p = U_p/2 + L_p/2$ lines 5 & 0'

Since a scaling factor of 6:5 is used, it is necessary to introduce a discontinuity in the weighting scheme. To prevent the discontinuity from crossing the boundary of each six line group, the discontinuity is introduced between output lines generated by filters 3 and 4. Thus, flicker is most likely to be generated by the relative contrast between the two output lines generated by filters 3 and 4. In order to reduce this flicker, luminance data from a third input line must be introduced into the weighting scheme. An output line generated by filter 3 may weight RGB pixel data from input lines 2 and 3 and include an adjustment factor to factor luminance data from a third input line, in this instance, input line 4. An output line generated by filter 4 may weight RGB pixel data from input lines 4 and 5 and include an adjustment factor to factor luminance data from a third input line, in this instance, input line 3.

In order to include luminance data from the third line, a series of luminance values are determined for each line in luminance generator 456 and are stored in Y save buffer 458. In order to reduce component count, Y save buffer 458 may be formed from an unused portion of video memory 101. The luminance values for the pixel data from the latches 108 and 109 are generated as luminance values Yc (current) and Ya (another).

Generally the Yc value will be the luminance value for that pixel data in the line adjacent the third input line to be included in the weighting scheme. Thus, for an output line generated by filter 3, Yc may be calculated for pixel data on input line 3 (lower line L). For an output line generate by filter 4, Yc may be calculated for pixel data on input line 4 (upper line U).

Luminance values Ya are calculated for pixel data from the other line of the upper (U) and lower (L) line pair. Thus, for an output line generated by filter 3, Ya will be calculated for pixel data on input line 2 (upper line U). For an output line generated by filter 4, Ya will be calculated for pixel data on input line 5 (lower line L).

As shown in FIG. 4, Yc data is stored in Y save buffer 458 to be later passed to Y save FIFO 454 and output as saved luminance data Ys. Note that in the weighting schemes shown above, it may be necessary to include luminance data from a succeeding line (e.g., a line generated by filter 3 requires luminance data from pixels on line 4). Since pixel data for the succeeding line has not been read, luminance data may be provided from the succeeding scan line in a previous field. In general, data from the previous field may be identical to, or similar to data from the present field, particularly in computer graphics applications.

Thus, Y save buffer 458 may be provided with sufficient size to store luminance data from selected lines in a previous field. For the weighting scheme shown above, stored luminance data is only required for output lines generated by filters 3 and 4, or two of every five output lines. For a 640 by 480 image (reduced to 640 by 400 pixels), pixel luminance data for 160 lines of data (or 102,400 pixels) is stored in Y save buffer 458. Line counter 453 keeps track of the current input and output lines such that the saved luminance data Ys is weighted with the proper output lines.

Luminance data may be calculated using a standard RGB to YUV conversion, or by using a simplified conversion technique. The luminance values (Ya, Yc, and Ys) can be generated as a two-bit values. For the simplified luminance calculation technique, it is assumed that the RGB pixel data is 18-bit RGB pixel data (6 bits each for Red, Blue and Green). It should be appreciated that other numbers of bits for each color may be used, with suitable modification of the conversion scheme, without departing from the spirit and scope of the invention. Luminance data is more dependent on the intensity of the Red and Green portions of the pixel data. The three most significant bits of the six bit green data and the two most significant bits of the six bit red data are first added together to produce a four bit sum. Relative luminance values are then calculated according to Table 3.

Once the luminance values have been calculated, an adjustment scheme is selected in Y adjust 455. The adjustment scheme is determined from the difference between luminance values Yc and Ys and from the Ya value. Table 4 illustrates one method for selecting the adjustment scheme. Once the adjustment scheme has been selected, it is fed to control unit 457, which synchronizes the adjustment scheme with input from line counter 453. The appropriate adjustment scheme is enabled in weighting control 410, which enables the five weighting schemes or filters shown above.

TABLE 3

| 4-bit Sum | Ys or Yc | Ya |
|---|---|---|
| 0000 | 00 | 00 |
| 0001 | 00 | 00 |
| 0010 | 00 | 01 |
| 0011 | 01 | 01 |
| 0100 | 01 | 01 |
| 0101 | 10 | 01 |
| 0110 | 10 | 10 |
| 0111 | 10 | 10 |
| 1000 | 11 | 10 |
| 1001 | 11 | 11 |
| 1010 | 11 | 11 |

Note that the luminance adjustment schemes shown in Table 4 add a fixed hexadecimal value to the weighted RGB pixel color data. It has been determined empirically that these hexadecimal values provide the proper adjustment to each pixel color to attenuate relative contrast between even and odd field lines and thus reduce flicker. It should be appreciated that other fixed values may be added or subtracted, or other algorithms employed to suitably adjust the RGB pixel color data. Fixed values have been selected here, as a multiplying factor may not work efficiently for RGB pixel color data having low or zero values.

TABLE 4

| Yc–Ys | Ya | Un@ADJ | Ln@ADJ |
|---|---|---|---|
| –3 | 3 | Un/2+10h | Ln/2+10h |
| –3 | 1 or 2 | Un/2+30h | Ln/2+30h |
| –3 | 0 | Un/2+70h | Ln/2+70h |
| –2 | don't care | Un/2+10h | Ln/2+10h |
| –1 | don't care | Un/2 | Ln/2 |
| 0 (min) | don't care | Un/2 | Ln/2 |
| 0 (max) | Ya–Yc=–3 | Un/2+20h | Ln/2+20h |
| 0 (max) | Ya–Yc>–3 | Un/2 | Ln/2 |
| +1 | don't care | Un/2 | Ln/2 |
| +2 | don't care | Un/2–Un/16 | Ln/2–Ln/16 |
| +3 | 3 | Un/8 | Ln/8 |
| +3 | 1 or 2 | Un/4 | Ln/4 |
| +3 | 0 | Un/2 | Ln/2 |

Note that in Table 4, there are two different equations for the Yc–Ys=0 case, defined as max and min. Either one of these cases may be selected by setting an appropriate bit or bits in a suitable data register. The selection of the different equations may be dynamically selected on the basis of image content (e.g., live action or multimedia versus graphics or text) or may be preselected. The overall weighting scheme and addressing mode for 480 line to 400 line scaling with flicker reduction is summarized in the table in FIG. 6.

Figure 7C:
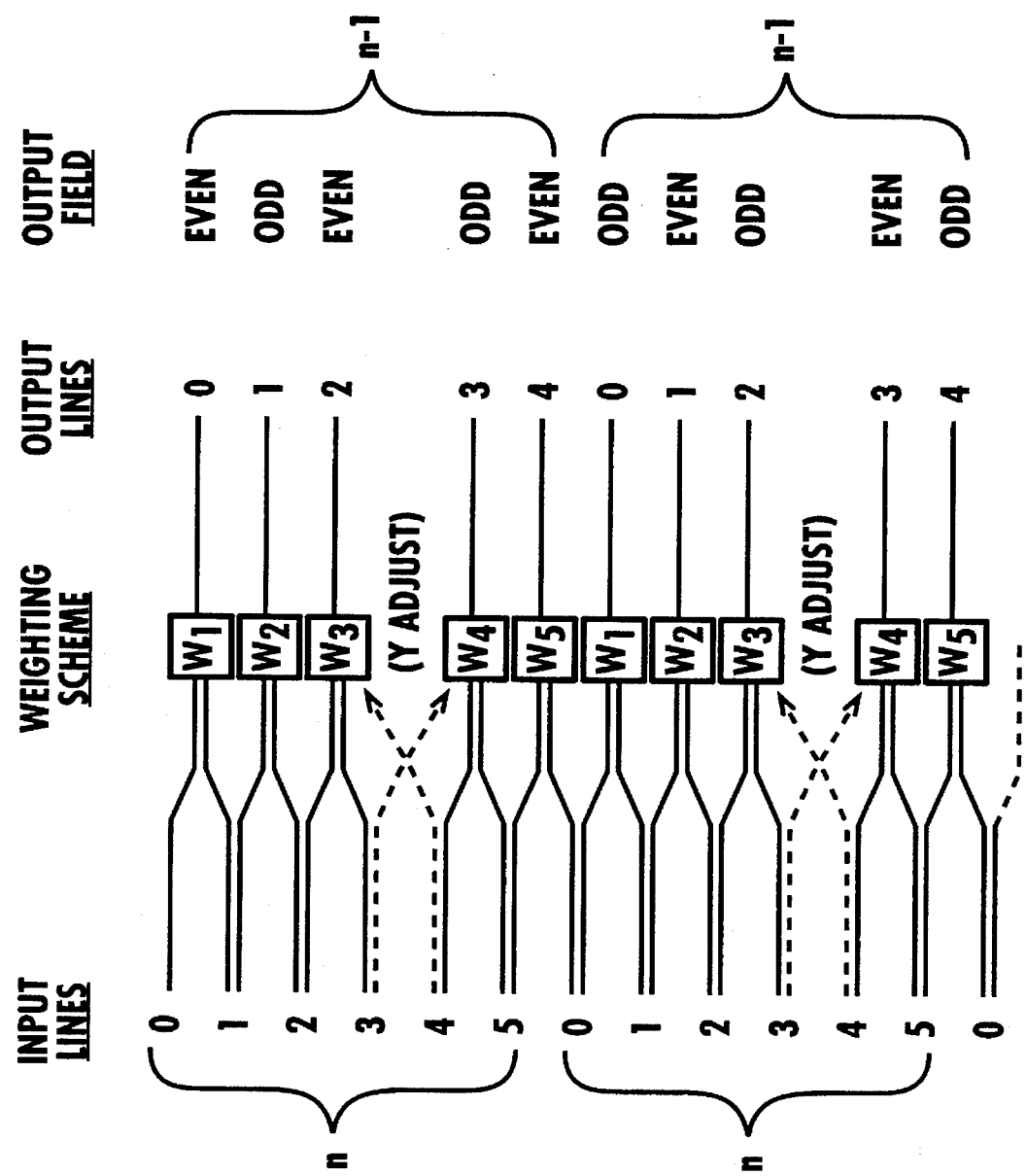
FIG. 7C is a table illustrating the locations of discontinuities in a third embodiment of five weighting schemes.

FIG. 7C further illustrates how the discontinuity is eliminated for the third embodiment of five weighting schemes. It is illustrative to compare FIGS. 7C and 7A. Referring now to FIG. 7C a number of groups of six input lines 0 through 5 are represented in the right hand column. In the first middle column, the weighting schemes or filters 1–5 are shown as $W_1$ through $W_5$. In the second middle column, the numbering for groups of five output lines 0 through 4 are shown. In the right hand column is indicated whether a given output line is for an even or odd field. Lines connecting the numbers of input lines to weighting schemes to output lines represent the data path for each output line. The dotted lines indicate the path for luminance adjustment data. Note that the discontinuity from filters $W_3$ and $W_4$ (affecting output lines 2 and 3) has been attenuated as luminance adjustment data is now provided from input lines adjacent the discontinuity. Note that for a given n input lines, a total of n–1 lines are output. Here n equals six.

The table in FIG. 6 summarizes the operation of scaling and flicker reduction for a 480 to 400 line conversion. In the first column, the addressing mode for the even field is shown. For example, for the first output line, pixel data from input lines 0 and 1 are weighted together. For the second output line (in the even field) pixel data from input lines 2, 3 and luminance values from pixel data from line 4 (Y4) are weighted together. In the second column, the data stored in the Y save buffer 458 is shown. For example, during the second line of the even field, the luminance value for pixel data for line 3 (Y3) is saved.

The third column indicates which filter (1–5) is applied to the weighted data. Note, as discussed above, the filters are sequentially applied in a repeating sequence of (1,3,5,2,4, . . . ). The fourth column indicates the addressing mode for the odd lines, in a similar manner to the first column. The fifth column indicates which luminance values for the odd field are saved in Y save buffer 458. The sixth column indicates the filters applied to the pixel data addressed for odd line output. The seventh column indicates the corresponding field line number (0 to 199 for a 200 line field), whereas the eighth column indicates line count (0–4) for the five lines in each group of five output lines.

As may be seen from the table in FIG. 6, the addressing mode and weighting scheme is set such that contrast for each adjacent interlaced line is attenuated without discontinuities. In addition, the vertical resolution of the image is reduced from 480 lines to 400 lines, suitable for an interlaced video display such as an NTSC television receiver or monitor.

Referring back to FIG. 4, the output of weighting control 410 may comprise 24 bit hybrid pixel data which may comprise RGB pixel data of three groups of eight bits each for each of three colors Red, Blue, and Green. As illustrated in FIG. 4, the output pixel color data from upper and lower latches 108 and 109 may comprise eighteen bit pixel color data (six bits for each color). As a constant value may be added to the pixel color data in weighting control 410, it is possible that the sum for a color may exceed six bits. Thus, a total of 24 bits are provided as output from weighting control 410.

After the RGB pixel data has been weighted, the output RGB pixel data is then fed to digital to analog converter DAC 111 and converted into analog RGB signals in a manner similar to that illustrated in FIG. 3. The analog RGB output, combined with a TTL composite sync (not shown) may then be converted into an interlaced analog format such as NTSC or PAL in NTSC/PAL converter 112 also in a manner similar to that illustrated in FIG. 3. NTSC/PAL converter 112 converts the RGB analog input, along with the TTL composite sync into a composite video signal.

The composite video signal may be fed to interlaced display 113 if interlaced display 113 is provided with a composite video input. Alternately, the output of NTSC/PAL converter 112 may be RF modulated and fed to an RF input of interlaced display 113. For the purposes of illustration, the interlaced display is shown as a television. However, other types of interlaced displays (e.g., interlaced monitor or the like) may be used with the present invention without departing from the spirit and scope of the present invention.

The operation of the present invention has particular application to video controller circuitry integrated into semiconductor circuit (e.g., LSI, VLSI, semi-custom ASIC or the like). In particular, the present invention has particular application to a video controller integrated circuit with on-chip look up table (LUT) and digital to analog converter (DAC), sometimes referred to in combination as a RAM-DAC. By providing the RAMDAC in the same integrated circuit as the other components of the video controller (e.g., sequence controller, data path, and the like) the present invention may be more readily implemented. For example, with an on-chip RAMDAC, additional on-chip circuitry may be provided between the RAM portion of the RAMDAC (i.e., look up table or LUT) to weight RGB data from separate scan lines into hybrid output data. The hybrid output data may then be fed to the DAC portion of the RAMDAC.

Conventional video controller integrated circuits may utilize discrete RAMDAC components which are off-chip. In order to implement the present invention in such a design, it may be necessary to provide a specialized discrete RAMDAC component, along with necessary control and signal lines to provide proper timing and control to weight RGB pixel data from separate scan lines.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein.

For example, although the present invention has particular application for providing an NTSC video output for a VGA controller, the present invention may also be applied to other types of interlaced displays (e.g., interlaced monitor) or displays where flicker or high contrast present difficulties. Further, the present invention may be applied to other types of video controller standards (e.g., EGA, CGA, or the like) and may be applied to other types of computers or display devices (e.g., Macintosh™, Personal Digital Assistant, or the like). In addition, the present invention may be applied to non-computer devices, such a digital television displays (e.g., interactive television, HDTV, video-on-demand, or the like). For example, the present invention could be applied to convert a digital HDTV signal to an analog NTSC signal in order to properly scale the image and reduce flicker. Other applications of the present invention would be readily apparent to one of ordinary skill in the art.

It is therefore intended that the protection granted hereon be limited only by the definition contained in the appended claims and equivalents thereof.

We claim:

1. An apparatus for generating an interlaced video display image from a source image stored as a plurality of horizontal scan lines of pixel data stored as pixel color addresses in a video memory, said apparatus comprising:

a controller, coupled to said video memory, for selectively reading from said video memory a first pixel color address from a first horizontal scan line of said source image and a second pixel color address from a second horizontal scan line of said source image;

a look up table, coupled to said video memory, for reading said first pixel color address and outputting first output pixel color data from said look up table at the first pixel color address and reading said second pixel color address and outputting second output pixel color data from said look up table at the second pixel color address;

weighting means, coupled to said look up table, for receiving said first output pixel color data and said second output pixel color data and outputting hybrid pixel color data as a weighted value of at least said first output pixel color data and said second output pixel color data;

first latch means, coupled to said look up table, for latching said first output pixel color data; and second latch means, coupled to said look up table, for latching said second output pixel color data;

wherein said hybrid pixel color data forms pixel data for a plurality of horizontal scan lines of the interlaced video display image.

2. The apparatus of claim 1, wherein said weighting means outputs hybrid pixel color data comprising a plurality of color data, each of said plurality of color data representing an average of corresponding color data from said first output pixel color data and said second output pixel color data.

3. The apparatus of claim 1, wherein said weighting means outputs hybrid pixel color data comprising a plurality of color data, each of said plurality of color data representing five-eighths the value of corresponding color data said first output pixel color data and three-eights the value of corresponding color data from said second output pixel color data.

4. The apparatus of claim 1, further comprising:

first storage means, coupled to said video memory, for storing first pixel color addresses from a first horizontal line of said source image;

second storage means, coupled to said video memory, for storing second pixel color addresses from a second horizontal line of said source image;

a multiplexor, coupled to said first storage means, said second storage means, and said look up table, for multiplexing said first pixel color addresses and said second pixel color addresses and outputting multiplexed pixel color addresses to said look up table.

5. The apparatus according to claim 1, wherein said weighting means computes a weighted value of at least said first output pixel color data and said second output pixel color data according to at least one of a predetermined number of weighting schemes, each of said predetermined number of weighting schemes being applied to first and second output pixel color data from successive pairs of first and second horizontal scan lines.

6. An apparatus for generating an interlaced video display image from a source image stored as a plurality of horizontal scan lines of pixel data stored as pixel color addresses in a video memory, said apparatus comprising:

a controller, coupled to said video memory, for selectively reading from said video memory a first pixel color address from a first horizontal scan line of said source image and a second pixel color address from a second horizontal scan line of said source image;

a look up table, coupled to said video memory, for reading said first pixel color address and outputting first output pixel color data from said look up table at the first pixel color address and reading said second pixel color address and outputting second output pixel color data from said look up table at the second pixel color address; and weighting means, coupled to said look up table, for receiving said first output pixel color data and said second output pixel color data and outputting hybrid pixel color data as a weighted value of at least said first output pixel color data and said second output pixel color data;

wherein said hybrid pixel color data forms pixel data for a plurality of horizontal scan lines of the interlaced video display image, said weighting means computes a weighted value of at least said first output pixel color data and said second output pixel color data according to at least one of a predetermined number of weighting schemes, each of said predetermined number of weighting schemes being applied to first and second output pixel color data from successive pairs of first and second horizontal scan lines, and said plurality of horizontal scan lines equals x horizontal scan lines divided into a plurality of groups of n horizontal scan lines, and said predetermined number of weighting schemes comprises n−1 weighting schemes applied to output pixel color data from successive pairs of first and second horizontal scan lines such that for each group of n horizontal scan lines of pixel color addresses read from said video memory, said weighting means outputs n−1 horizontal scan lines of hybrid pixel color data so as to vertically scale the source image by a ratio of n:n−1.

7. The apparatus of claim 6, wherein x equals 480 and n equals 6.

8. The apparatus according to claim 6, wherein said n−1 weighting schemes comprise the following five weighting schemes OUT1 through OUT5:

$OUT1_p = U_p/2 + L_p/2$ $OUT2_p = U_p/4 = U_p/ 8 = L_p/2 = L_p/8$ $OUT3_p = U_p/4 + L_p/2 + L_p/4$ $OUT4_p = U_p/2 + U_p/4 + L_p/4$ $OUT5_p = U_p/2 + U_p/8 + L_p/4 + L_p/8$ where p represents a pixel number, U represents an upper scan line of a pair of first and second horizontal scan lines, and L represents a lower scan line of a pair of first and second horizontal scan lines.

9. An apparatus for generating an interlaced video display image from a source image stored as a plurality of horizontal scan lines of pixel data stored as pixel color addresses in a video memory, said apparatus comprising:

a controller, coupled to said video memory, for selectively reading from said video memory a first pixel color address from a first horizontal scan line of said source image and a second pixel color address from a second horizontal scan line of said source image;

a look up table, coupled to said video memory, for reading said first pixel color address and outputting first output pixel color data from said look up table at the first pixel color address and reading said second pixel color address and outputting second output pixel color data from said look up table at the second pixel color address;

weighting means, coupled to said look up table, for receiving said first output pixel color data and said second output pixel color data and outputting hybrid pixel color data as a weighted value of at least said first output pixel color data and said second output pixel color data;

luminance value calculating means, for calculating luminance values for said first and second output pixel color data;

luminance storage means, for storing at least one of said calculated luminance values; and luminance adjustment factor calculating means, coupled to said luminance value calculating means, said luminance storage means, and said weighting means, for calculating a luminance adjustment factor from calculated luminance values for said first and second output pixel color data and a previously stored luminance value for output pixel color data from a line adjacent to said first or second horizontal scan lines;

wherein said weighting means further selectively generates said hybrid pixel color data as a weighted average of said first output pixel color data and said second output pixel color data and said luminance adjustment factor and said hybrid pixel color data forms pixel data for a plurality of horizontal scan lines of the interlaced video display image.

10. The apparatus according to claim 9, wherein said weighting means computes a weighted value of at least said first output pixel color data and said second output pixel color data according to at least one of a predetermined number of weighting schemes, each of said predetermined number of weighting schemes being applied to first and second output pixel color data from successive pairs of first and second horizontal scan lines.

11. The apparatus according to claim 10, wherein said plurality of horizontal scan lines equals x horizontal scan lines divided into a plurality of groups of n horizontal scan lines, and said predetermined number of weighting schemes comprises n–1 weighting schemes applied to output pixel color data from successive pairs of first and second horizontal scan lines such that for each group of n horizontal scan lines of pixel color addresses read from said video memory, said weighting means outputs n–1 horizontal scan lines of hybrid pixel color data so as to vertically scale the source image by a ratio of n:n–1.

12. The apparatus of claim 11, wherein x equals 480 and n equals 6.

13. The apparatus according to claim 11, wherein said n–1 weighting schemes comprise the following five weighting schemes OUT1 through OUT5:

$OUT1_p = U_p/2 + L_p/2$ $OUT2_p = U_p/2 + L_p/2$ $OUT3_p = U_p/2 + (L_p @ ADJ)$ $OUT4_p = L_p/2 + (U_p @ ADJ)$ $OUT5_p = U_p/2 + L_p/2$ where p represents a pixel number, U represents an upper scan line of a pair of first and second horizontal scan lines, L represents a lower scan line of a pair of first and second horizontal scan lines, and ADJ indicates output pixel color data for a respective upper or lower scan line is adjusted by said luminance adjustment factor calculating means.

14. The apparatus according to claim 13, wherein individual color data for output pixel color data of a respective upper or lower scan line is adjusted by adding or subtracting a predetermined value from the individual color data in accordance with the relative contrast between corresponding color data from output pixel color data from said upper scan line, said lower scan line and a third scan line adjacent said upper or lower scan line.

15. A method for generating an interlaced display image from a source image comprising a plurality of horizontal scan lines of pixel data stored as pixel color addresses in a memory, said method comprising the steps of:

selectively retrieving from said memory a first pixel color address from a first horizontal scan line;

selectively retrieving from said memory a second pixel color address from a second horizontal scan line;

outputting from a look up table, first and second output pixel color data stored at corresponding first and second pixel color addresses in said look up table;

weighting at least said first and second output pixel color data to produce hybrid pixel color data for a horizontal output line of said interlaced display image;

storing said first output pixel color data in a first latch;

storing said second output pixel color data in a second latch;

transferring said first output pixel color data from said first latch to said weighting means; and transferring said second output pixel color data from said second latch to said weighting means, wherein said plurality of horizontal scan lines equals x horizontal scan lines divided into a plurality of groups of n horizontal scan lines, and said predetermined number of weighting schemes comprises n–1 weighting schemes applied to output pixel color data from successive pairs of first and second horizontal scan lines such that for each group of n horizontal scan lines of pixel color addresses read from said video memory, said weighting means outputs n–1 horizontal scan lines of hybrid pixel color data so as to vertically scale the source image by a ratio of n:n–1.

16. The method of claim 15, further comprising the steps of:

storing said first pixel color address retrieved from said memory in a first FIFO; and storing said second pixel color address retrieved from said memory in a second FIFO.

17. The method of claim 16, further comprising the steps of:

multiplexing said first pixel color address from said first FIFO with said second pixel color address from said second FIFO to produce multiplexed pixel color addresses; and transferring said multiplexed pixel color addresses to said look up table.

18. The method of claim 17, further comprising the steps of:

storing said first output pixel color data in a first latch;

storing said second output pixel color data in a second latch;

transferring said first output pixel color data from said first latch to said weighting means; and transferring said second output pixel color data from said second latch to said weighting means.

19. The method of claim 15, wherein said weighting step further comprises computing a weighted value of at least said first output pixel color data and said second output pixel color data according to at least one of a predetermined number of weighting schemes, each of said predetermined number of weighting schemes being applied to first and second output pixel color data from successive pairs of first and second horizontal scan lines.

20. The method of claim 15, wherein x equals 480 and n equals 6.

21. The method of claim 15, wherein said n−1 weighting schemes comprise the following five weighting schemes OUT1 through OUT5:

$OUT1_p = U_p/2 + L_p/2$ $OUT2_p = U_p/4 = U_p/8 + L_p/2 + L_p/8$ $OUT3_p = U_p/4 + L_p/2 + L_p/4$ $OUT4_p = U_p/2 + U_p/4 + L_p/4$ $OUT5_p = U_p/2 + U_p/8 + L_p/4 + L_p/8$ where p represents a pixel number, U represents an upper scan line of a pair of first and second horizontal scan lines, and L represents a lower scan line of a pair of first and second horizontal scan lines.

22. The method of claim 21, wherein said weighting step further comprises computing a weighted value of at least said first output pixel color data and said second output pixel color data according to at least one of a predetermined number of weighting schemes, each of said predetermined number of weighting schemes being applied to pixel data from successive pairs of first and second horizontal scan lines.

23. The method of claim 15, wherein x equals 480 and n equals 6.

24. The method of claim 23, wherein output pixel color data for a respective upper or lower scan line is adjusted by adding or subtracting a predetermined value from the output pixel color data in accordance with the relative contrast between output pixel color data from said upper scan line, said lower scan line and a third scan line adjacent said upper or lower scan line.

25. A method for generating an interlaced display image from a source image comprising a plurality of horizontal scan lines of pixel data stored as pixel color addresses in a memory, said method comprising the steps of:

selectively retrieving from said memory a first pixel color address from a first horizontal scan line;

selectively retrieving from said memory a second pixel color address from a second horizontal scan line;

outputting from a look up table, first and second output pixel color data stored at corresponding first and second pixel color addresses in said look up table;

weighting at least said first and second output pixel color data to produce hybrid pixel color data for a horizontal output line of said interlaced display image;

calculating luminance values for said first and second output pixel color data;

storing at least one of said calculated luminance values in a buffer;

retrieving, from said buffer, a previously stored luminance value for output pixel color data from a line adjacent to said first or second horizontal scan lines; and calculating a luminance adjustment factor from the calculated luminance values for said first and second output pixel color data and the previously stored luminance value;

wherein said step of weighting further comprises selectively weighting said first and second output pixel color data with said luminance adjustment factor to produce hybrid pixel color data for a horizontal output line of said interlaced display image.

26. The method of claim 25, wherein said plurality of horizontal scan lines equals x horizontal scan lines divided into a plurality of groups of n horizontal scan lines, and said predetermined number of weighting schemes comprises n−1 weighting schemes applied to output pixel color data from successive pairs of first and second horizontal scan lines such that for each group of n horizontal scan lines of pixel color addresses read from said video memory, said weighting means outputs n−1 horizontal scan lines of hybrid pixel color data so as to vertically scale the source image by a ratio of n:n−1.

27. The method of claim 26, wherein said n−1 weighting schemes comprise the following five weighting schemes OUT1 through OUT5:

$OUT1_p = U_p/2 + L_p/2$ $OUT2_p = U_p/2 + L_p/2$ $OUT3_p = U_p/2 + (L_p @ ADJ)$ $OUT4_p = L_p/2 + (U_p @ ADJ)$ $OUT5_p = U_p/2 + L_p/2$ where p represents a pixel number, U represents an upper scan line of a pair of first and second horizontal scan lines, L represents a lower scan line of a pair of first and second horizontal scan lines, and ADJ indicates output pixel color data for a respective upper or lower scan line is adjusted by said luminance adjustment factor calculating means.

28. A system for displaying an interlaced video display image, comprising:

a processor for receiving or generating a non-interlaced source image data;

a video memory, coupled to said processor, for storing said source image data as a plurality of horizontal scan lines of pixel data representing pixel color addresses;

a controller, coupled to said video memory, for selectively reading from said video memory a first pixel color address from a first horizontal scan line of said source image and a second pixel color address from a second horizontal scan line of said source image;

a look up table, coupled to said video memory, for reading said first pixel color address and outputting first output pixel color data from said look up table at the first pixel color address and reading said second pixel color address and outputting second output pixel color data from said look up table at the second pixel color address;

weighting means, coupled to said look up table, for receiving said first output pixel color data and said second output pixel color data and outputting hybrid pixel color data as a weighted value of at least said first output pixel color data and said second output pixel color data;

digital to analog converting means, coupled to said weighting means, for receiving said hybrid pixel color data and converting said hybrid pixel color data into an analog output video signal;

interlaced display means, coupled to said digital to analog converting means, for displaying said analog output video signal as a field of an interlaced display image;

first latch means, coupled to said look up table, for latching said first output pixel color data; and second latch means, coupled to said look up table, for latching said second output pixel color data.

29. The system of claim 28 wherein said weighting means outputs hybrid pixel color data comprising a plurality of color data, each of said plurality of color data representing an average of corresponding color data from said first output pixel color data and said second output pixel color data.

30. The system of claim 28, wherein said weighting means outputs hybrid pixel color data comprising a plurality of color data, each of said plurality of color data representing five-eights the value of corresponding color data said first output pixel color data and three-eights the value of corresponding color data from said second output pixel color data.

31. The system of claim 28, further comprising:

first storage means, coupled to said video memory, for storing first pixel color addresses from a first horizontal line of said source image;

second storage means, coupled to said video memory, for storing second pixel color addresses from a second horizontal line of said source image;

a multiplexor, coupled to said first storage means, said second storage means, and said look up table, for multiplexing said first pixel color addresses and said second pixel color addresses and outputting multiplexed pixel color addresses to said look up table.

32. The system according to claim 28, wherein said weighting means computes a weighted value of at least said first output pixel color data and said second output pixel color data according to at least one of a predetermined number of weighting schemes, each of said predetermined number of weighting schemes being applied to first and second output pixel color data from successive pairs of first and second horizontal scan lines.

33. A system for displaying an interlaced video display image, comprising:

a processor for receiving or generating a non-interlaced source image data;

a video memory, coupled to said processor, for storing said source image data as a plurality of horizontal scan lines of pixel data representing pixel color addresses;

a controller, coupled to said video memory, for selectively reading from said video memory a first pixel color address from a first horizontal scan line of said source image and a second pixel color address from a second horizontal scan line of said source image;

a look up table, coupled to said video memory, for reading said first pixel color address and outputting first output pixel color data from said look up table at the first pixel color address and reading said second pixel color address and outputting second output pixel color data from said look up table at the second pixel color address;

weighting means, coupled to said look up table, for receiving said first output pixel color data and said second output pixel color data and outputting hybrid pixel color data as a weighted value of at least said first output pixel color data and said second output pixel color data;

digital to analog converting means, coupled to said weighting means, for receiving said hybrid pixel color data and converting said hybrid pixel color data into an analog output video signal; and interlaced display means, coupled to said digital to analog converting means, for displaying said analog output video signal as a field of an interlaced display image, wherein said weighting means computes a weighted value of at least said first output pixel color data and said second output pixel color data according to at least one of a predetermined number of weighting schemes, each of said predetermined number of weighting schemes being applied to first and second output pixel color data from successive pairs of first and second horizontal scan lines, and said plurality of horizontal scan lines equals x horizontal scan lines divided into a plurality of groups of n horizontal scan lines, and said predetermined number of weighting schemes comprises n−1 weighting schemes applied to output pixel color data from successive pairs of first and second horizontal scan lines such that for each group of n horizontal scan lines of pixel color addresses read from said video memory, said weighting means outputs n−1 horizontal scan lines of hybrid pixel color data so as to vertically scale the source image by a ratio of n:n−1.

34. The system of claim 33, wherein x equals 480 and n equals 6.

35. The system according to claim 33, wherein said n−1 weighting schemes comprise the following five weighting schemes OUT1 through OUT5:

$OUT1_p = U_p/2 + L_p/2$ $OUT2_p = U_p/4 + U_p/8 + L_p/2 + L_p/8$ $OUT3_p = U_p/4 + L_p/2 + L_p/4$ $OUT4_p = U_p/2 + U_p/4 + L_p/4$ $OUT5_p = U_p/2 + U_p/8 + L_p/4 + L_p/8$ where p represents a pixel number, U represents an upper scan line of a pair of first and second horizontal scan lines, and L represents a lower scan line of a pair of first and second horizontal scan lines.

36. A system for displaying an interlaced video display image, comprising:

a processor for receiving or generating a non-interlaced source image data;

a single port video memory, coupled to said processor, for storing said non-interlaced source image data sequentially as a plurality of sequential horizontal scan lines of pixel data representing pixel color addresses;

a controller, coupled to said video memory, for selectively reading from said video memory a first pixel color address from a first horizontal scan line of said source image and a second pixel color address from a second horizontal scan line of said source image;

a look up table, coupled to said video memory, for reading said first pixel color address and outputting first output pixel color data from said look up table at the first pixel color address and reading said second pixel color address and outputting second output pixel color data from said look up table at the second pixel color address;

weighting means, coupled to said look up table, for receiving said first output pixel color data and said second output pixel color data and outputting hybrid pixel color data as a weighted value of at least said first output pixel color data and said second output pixel color data;

digital to analog converting means, coupled to said weighting means, for receiving said hybrid pixel color data and converting said hybrid pixel color data into an analog output video signal;

interlaced display means, coupled to said digital to analog converting means, for displaying said analog output video signal as a field of an interlaced display image;

luminance value calculating means, for calculating luminance values for said first and second output pixel color data;

luminance storage means, for storing at least one of said calculated luminance values;

luminance adjustment factor calculating means, coupled to said luminance value calculating means, said luminance storage means, and said weighting means, for calculating a luminance adjustment factor from calculated luminance values for said first and second output pixel color data and a previously stored luminance value for output pixel color data from a line adjacent to said first or second horizontal scan lines; and wherein said weighting means further selectively generates said hybrid pixel color data as a weighted average of said first output pixel color data and said second output pixel color data and said luminance adjustment factor.

37. The system according to claim 36, wherein said weighting means computes a weighted value of at least said first output pixel color data and said second output pixel color data according to at least one of a predetermined number of weighting schemes, each of said predetermined number of weighting schemes being applied to first and second output pixel color data from successive pairs of first and second horizontal scan lines.

38. The system according to claim 37, wherein said plurality of horizontal scan lines equals x horizontal scan lines divided into a plurality of groups of n horizontal scan lines, and said predetermined number of weighting schemes comprises n−1 weighting schemes applied to output pixel color data from successive pairs of first and second horizontal scan lines such that for each group of n horizontal scan lines of pixel color addresses read from said video memory, said weighting means outputs n−1 horizontal scan lines of hybrid pixel color data so as to vertically scale the source image by a ratio of n:n−1.

39. The system of claim 38, wherein x equals 480 and n equals 6.

40. The system according to claim 38, wherein said n−1 weighting schemes comprise the following five weighting schemes OUT1 through OUT5:

$OUT1_p = U_p/2 + L_p/2$ $OUT2_p = U_p/2 + L_p/2$ $OUT3_p = U_p/2 + (L_p @ ADJ)$ $OUT4_p = L_p/2 + (U_p @ ADJ)$ $OUT5_p = U_p/2 + L_p/2$ where p represents a pixel number, U represents an upper scan line of a pair of first and second horizontal scan lines, L represents a lower scan line of a pair of first and second horizontal scan lines, and ADJ indicates output pixel color data for a respective upper or lower scan line is adjusted by said luminance adjustment factor calculating means.

41. The system according to claim 40, wherein individual color data for output pixel color data of a respective upper or lower scan line is adjusted by adding or subtracting a predetermined value from the individual color data in accordance with the relative contrast between corresponding color data from output pixel color data from said upper scan line, said lower scan line and a third scan line adjacent said upper or lower scan line.

\* \* \* \* \*